March 24, 1942. H. G. MERCHNT 2,277,127
IMPROVEMENT IN SAW GAUGING MEANS
Filed July 8, 1940 2 Sheets-Sheet 1
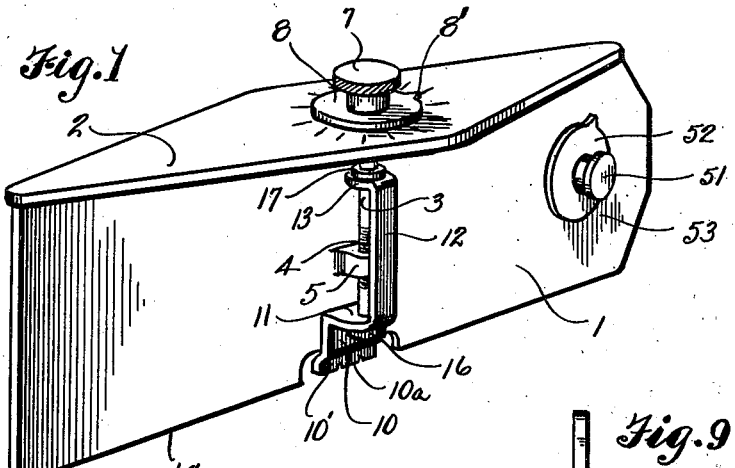
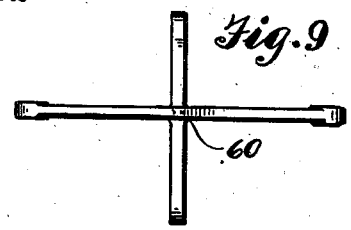
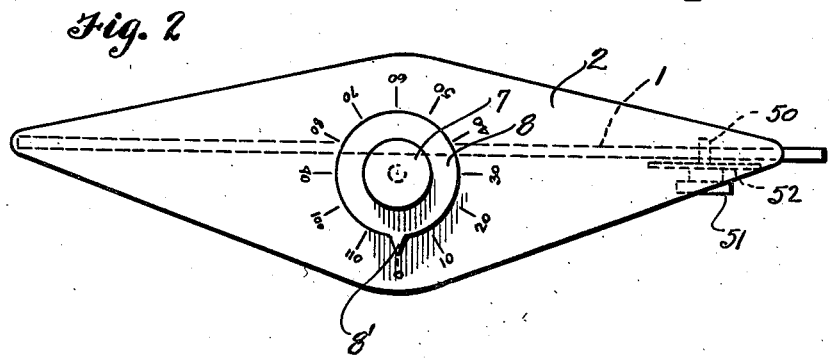
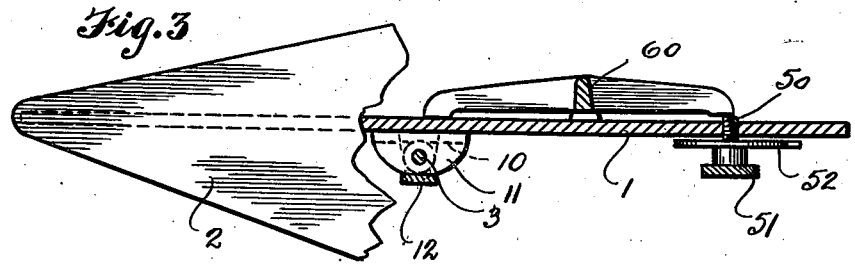
INVENTOR
HENRY G. MERCHANT
BY
Cook & Robinson
ATTORNEY March 24, 1942.  H. G. MERCHNT  2,277,127
IMPROVEMENT IN SAW GAUGING MEANS
Filed July 8, 1940  2 Sheets-Sheet 2
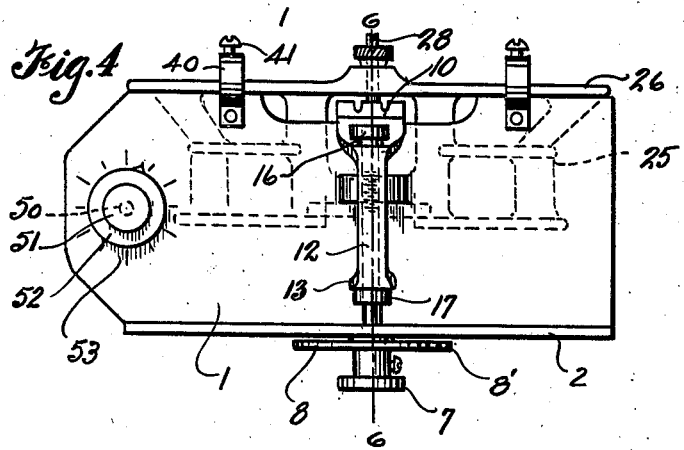
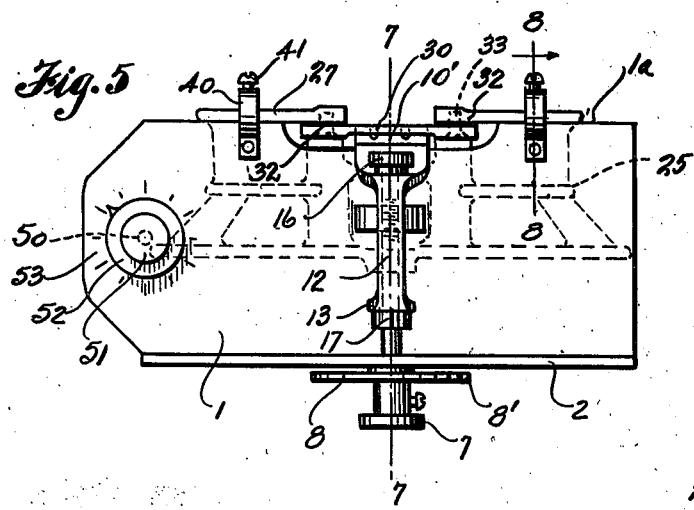
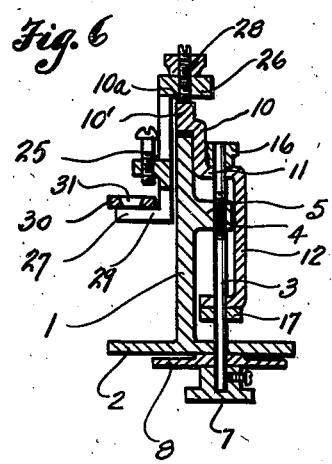
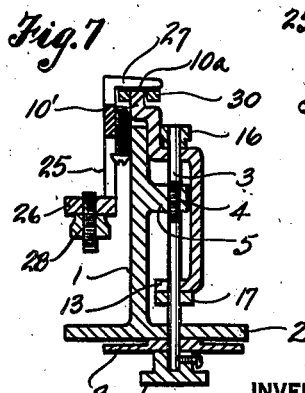
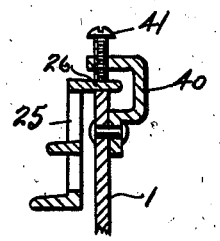
INVENTOR
HENRY G. MERCHANT
BY
Cook & Robinson
ATTORNEYS Patented Mar. 24, 1942

2,277,127

UNITED STATES PATENT OFFICE 2,277,127

IMPROVEMENT IN SAW GAUGING MEANS

Henry G. Merchant, Concrete, Wash.

Application July 8, 1940, Serial No. 344,403

3 Claims. (Cl. 33—202)

This invention relates to tools for determining the setting or adjustment of gauges and spiders of those kinds used for the setting and filing of the teeth of cross-cut lumber saws.

More particularly, the present invention has reference to a tool to be used for determining the proper adjustment and setting of saw gauges of the general character of that kind described and illustrated in U. S. Letters Patent No. 658,274, issued to J. Morin on Sept. 18, 1900.

Explanatory to the present invention, it will here be stated that any gauge of the general type of that in the above numbered patent, comprises a flat body plate formed along its opposite, longitudinal edges with oppositely directed flanges; each flange being adapted to serve as a straight edge, and one flange having a cut away portion or recess at a medial location which is spanned by an underlying, longitudinally slotted plate, while the other flange mounts a set screw at a central location, which screw is adjustable in the extent of its projection down through the flange. In use of such gauges, the body plate may be placed, for example, flatly against a side face of the saw that is to be filed and set with the flange thereof which carries the set screw overlying the points of the cutting teeth of the saw. By thus applying the gauge, as a straight edge, the evenness of length of the cutting teeth may be noted. Then, with the cutter made even, and engaged against the straight edge flange, the proper length of the raker teeth may be determined by reference to the extended end of the set screw. These operations are well understood by persons familiar with the device of the Morin patent above mentioned. Then, by reversing the gauge, its other flange may be similarly applied to the saw, as a straight edge engaging upon the points of the cutting teeth, with a set of raker teeth extended up through the slot of the gauge plate; it being understood that if these teeth project through the slot, they are too long and may be filed down to an exact and proper length by use of a file placed against and operated across that face of the plate beyond which the raker teeth project.

Furthermore, it will be stated that the proper setting of teeth of a cross-cut saw and the relative lengths of the cutting teeth and rakers is governed to a great extent by the character of wood that is to be cut by the saw. For use in soft woods, the cutting teeth of a saw should have more set and the raker teeth should be shorter than for use of the saw in hard woods.

In view of the above, it has been the principal object of this invention to provide a tool that is adapted to be used for making proper adjustment of the set screws and slotted gauge plates in gauges of the general type of that of the Morin patent, to adapt them for the setting of saws that are to be used in any specified kind of wood.

Other objects of the invention reside in the details of construction and combination of parts and in the use of the tool, as will hereinafter be fully described.

In accomplishing these and other objects of the invention, I have provided the improved details of construction, the preferred forms of which are illustrated in the accompanying drawings, wherein—

Fig. 1 is a perspective view of a tool embodied by the present invention.

Fig. 2 is a top view of the same.

Fig. 3 is a detail, partly in cross section, illustrating the application of a spider to the tool for testing the degree of set to be obtained by the spider.

Fig. 4 is a view of the present tool, as applied to a saw gauge for determining an adjustment of the set screw of the gauge.

Fig. 5 is a similar view, illustrating the application of the present tool to a saw gauge for a proper setting of the slotted gauge plate of the gauge.

Fig. 6 is a cross section on the line 6—6 in Fig. 4.

Fig. 7 is a cross section on line 7—7 in Fig. 5.

Fig. 8 is a cross section on the line 8—8 in Fig. 5.

Fig. 9 is a plan view of a spider.

Referring more in detail to the drawings—

The present tool as shown best in Fig. 1, comprises a flat body plate 1, substantially of rectangular form and formed with an integral flange 2 along one edge. The flange 2 is perfectly flat on top and bottom surfaces, and is disposed at a right angle relative to the side surfaces of plate 1. Preferably, the flange 2 tapers in width from its medial portion to its ends, as will be understood by reference to Fig. 2.

Extending perpendicularly through the flange 2 and along one side of the plate 1, is a shaft 3. This shaft is threaded, as at 4, through a boss 5 that is formed on the side of the plate 1. At the top end of the shaft, considering the tool as seen in Fig. 1, or at what would be the lower end when considering the tool as shown in Figs. 4 and 5, is fixed a knurled knob 7, and directly beneath the knob adjacent the flange 2, and mounted on the shaft to turn therewith, is a circular disk 8 having a pointer 8' at one side.

Formed on the face of the flange 2, about the disk 8, are graduations, as noted in Fig. 2, setting off a plurality of spaces of equal angular extent.

Located at that side of the plate 1, adjacent which shaft 3 is extended, and slidably engaging flatly against the side of the plate near its lower edge, is a shoe 10, having an out-turned flange 11 from which an arm 12 continues along the shaft. At the end of the arm, opposite the shoe, is an inturned ear 13. The shaft 3 extends rotatably through the flange 11, and also through the ear 13, and there are collars 16 and 17 fixed on the shaft to engage these parts to hold the shaft and shoe against relative longitudinal movement. Thus it will be understood that on turning the shaft 3 by means of the knob 7, the shaft, by reason of its threaded connection in the boss 5, will be shifted lengthwise and will shift the shoe 10 accordingly.

The main body portion of the shoe 10, as noted in Figs. 1 and 6, lies flatly against the side of the plate 1 so that it cannot turn, and it has an edge portion 10' offset inwardly within a recess 20 in the plate edge, as noted in Fig. 1. The bottom edge surface of the shoe, designated at 10a, is flat and is straight across.

In Figs. 4 to 8, the present tool has been shown as applied to a saw gauge of the type of the Morin patent, for setting the gauge. In these views, the gauge is designated in its entirety by reference numeral 25, and it has flanges 26 and 27 at opposite edges. The flange 26 of the gauge mounts the set screw 28, and the flange 27 has the recess 29 that is spanned by a plate 30 containing the longitudinal slot 31. The plate 30 may be spaced at different intervals below the flange to which it is attached by the insertion of shims 32 between its end portions and the adjacent flange portions, and screws 33 are extended through the end portions of the plate to attach it.

In the use of gauges of the type of the Morin patent, it has been determined by experience and experiment, just to what extent the end of the set screw 28 should extend below the flange 26 for the proper setting of the raker teeth of a saw for use in a particular kind of wood, and in the present tool, the proper setting of the shoe 10, preparatory to use of the tool for making an adjustment of the set screw 28 or plate 30 of the gauge, is automatically accomplished by adjustment of the pointer disk 8 to a certain position relative to the graduated scale that surrounds the disk.

For example, if a gauge is to be adjusted for use in the setting of a saw for work in a soft wood, the pointer of the disk 8 may, for example, be rotated to the "80" mark of the scale of graduations. This locates the edge 10a of the shoe at a definite position below the level of the line of the edge 1a of the plate 1. If the gauge is to be adjusted for the setting of a saw to be used in hard wood, then the pointer may, for example, be placed at the "30" mark, which lessens the distance to which the edge of the shoe is disposed within the line of the edge of the plate 1. Thus, by reference to the scale in adjusting the shaft 3, the shoe may be automatically adjusted to positions for gauging the extent of projection of the set screw of a gauge, or the amount of shimming beneath the plate 30, for setting of the raker teeth of a saw for work in wood of any particular hardness or character.

After an adjustment of the shoe has been made, then the saw gauge is applied thereto for the adjustment of its parts as has been illustrated in Figs. 4 and 5.

Assuming that the shoe 10 of the tool has been adjusted to adapt it for use in adjusting a gauge for setting a saw to be used in a particular kind of wood, the gauge is then applied to the tool as illustrated in Figs. 4 and 6, with the edge 1a of the plate 1 engaging against the straight edge flange 26 of the gauge 25. The set screw 28 is then adjusted, by turning it, until its lower edge just contacts the edge 10a of the shoe. This adjustment will accurately determine the extent of the set screw for gauging the length of raker teeth for that particular wood.

Then, to properly set the plate 30, the gauge is reversed in position and applied to the tool as shown by Figs. 5 and 7, and the end portion 10' of the shoe is projected up through the slot 31 of the plate 30. If the shoe projects through the slot beyond the face of the plate, then the plate is spaced or set down too far and must be readjusted by placing spacing shims of a different thickness between its ends and the flange to which it is attached.

It is to be understood that for a proper adjustment of plate 30, the top surface thereof should be exactly flush with the end surface of the shoe 10.

To facilitate the holding of the gauge on the testing tool while adjustment of its parts 28 or 30 is being made, I may provide two U-shaped clamps 40 that are affixed to the plate 1, as shown in Fig. 8, and these clamps carry clamping screws 41 adapted to be tightened against the gauge flanges to temporarily secure the two devices together.

In connection with the present device, I also provide a gauge for the filing of spiders of that kind comprising two integral crossed bars with laterally turned feet at their ends; three of the feet having flat end surfaces lying in the same plane, and the other foot terminating just short of that plane to the extent of the desired set of the teeth so that when the three feet of the device are applied flatly against the side of the saw, the fourth leg may be used as a means for gauging the lateral set of the teeth of the saw.

To provide for accurately determining the amount of relief of the short leg of the spider, I thread the screw 50 through the body plate 1 of the tool and place a turning knob 51 on one end and a pointer disk 52 adjacent the knob to follow a graduated scale 53 that surrounds the plate.

By adjusting the knob, the screw may be caused to be extended through the plate to a greater or lesser extent, as will be understood by reference to Fig. 3.

The extent to which the screw should be adjusted is determined by experiment and experience, and the scale 53 is graduated and numbered so that an adjustment suitable for any extent of set may be readily determined.

It will then be understood that, by placing a spider 60 against the flat surface of plate 1, as noted in Fig. 3, the proper relief of the short leg may be determined by reference to the extent of the screw beyond that surface of the plate. If the relieved leg of the spider appears to be too long, it can be filed off, and if it is too short, then the opposite leg is filed down until the gauged leg is of proper spacing from the face of the plate 1.

By use of the present tool, it is possible to accurately determine the setting of the gauge members for setting the saws to be used in woods of any particular character.

It is apparent that details of construction in the present device might be changed without departing from the spirit of the invention, and for this reason, it is not desired that the claims shall be limited only to those details herein illustrated, but that they shall be given an interpretation commensurate with the scope of the invention disclosed.

Having thus described my invention, what I claim therein and desire to secure by Letters Patent is—

1. A device of the character described comprising a flat plate formed with a straight edge and a recess in said edge, a threaded shaft mounted by the plate and extending perpendicular to the line of said straight edge, a contact shoe pivotally fixed on the shaft at one end and having a contact portion disposed within the said recess and adjustable, by turning the shaft, toward and from the line of said straight edge, a turning knob on the shaft and a graduated scale on the plate for indicating the position of adjustment of the contact shoe.

2. A device of the character described, comprising a flat, rectangular plate, formed with a straight edge, provided with a recess, and having a perpendicular flange along its opposite edge, a boss on the plate, a shaft threaded through the boss, extending along one side of the plate and through said flange, a contact shoe pivotally fixed on the end of the shaft and having a portion disposed in said recess for adjustment by the shaft toward and from the line of the said straight edge, a turning knob on the other end of the shaft, a pointer on the shaft and a graduated scale on the said plate flange adapted to be followed by the pointer to designate the position of adjustment of the shoe.

3. A device of the character described, comprising a flat, rectangular plate formed with a straight edge having a recess, and at its opposite edge with a perpendicular flange, a boss on the plate, a shaft extending through the flange and threaded into the boss, a plate mounted on the shaft for longitudinal shifting thereby and having a contact shoe with a straight edge, alined with the plane of the plate and movable with the shaft toward and from the line of said straight edge, a graduated scale on the plate flange, a pointer disk rotatable with the shaft and adapted to follow the said graduated scale to designate the adjustment of the contact shoe, and a turning knob for the shaft.

HENRY G. MERCHANT.